(12) United States Patent
Friedrich

(10) Patent No.: US 7,588,376 B2
(45) Date of Patent: Sep. 15, 2009

(54) CAMERA HOLDER FOR STAND

(76) Inventor: Frank Friedrich, Klammstrasse 3, Zimmern o. R., 78658 (DE)

( * ) Notice: Subject to any disclaimer, the term of this patent is extended or adjusted under 35 U.S.C. 154(b) by 384 days.

(21) Appl. No.: 11/380,366

(22) Filed: Apr. 26, 2006

(65) Prior Publication Data
US 2006/0239677 A1  Oct. 26, 2006

(30) Foreign Application Priority Data
Apr. 26, 2005  (DE) ............... 20 2005 006 620 U

(51) Int. Cl.
*G03B 17/00* (2006.01)
*F16M 11/14* (2006.01)
(52) U.S. Cl. .............. 396/419; 396/428; 248/183.2
(58) Field of Classification Search ........... 396/419, 396/428, 661; 248/177.1, 178.1, 179.1, 183.2, 248/187.7, 228; 352/243
See application file for complete search history.

(56) References Cited

U.S. PATENT DOCUMENTS

| | | | |
|---|---|---|---|
| 2,364,363 A | 12/1944 | Howell | |
| 4,033,539 A * | 7/1977 | Bardocz | ............ 248/228.6 |
| 4,929,973 A * | 5/1990 | Nakatani | ............ 248/177.1 |
| 5,347,997 A | 9/1994 | Weiler et al. | |
| 6,027,085 A | 2/2000 | Ruther | |
| 6,196,504 B1 * | 3/2001 | Lemke | ............ 248/187.1 |

FOREIGN PATENT DOCUMENTS

| | | |
|---|---|---|
| DE | 203 12 747 U1 | 10/2003 |
| DE | 20312747 U | 10/2003 |
| DE | 202005001542 U | 3/2005 |
| EP | 0531220 | 3/1993 |

* cited by examiner

*Primary Examiner*—Melissa J Koval
*Assistant Examiner*—Minh Q Phan
(74) *Attorney, Agent, or Firm*—Akerman Senterfitt; Peter A. Chiabotti

(57) ABSTRACT

A camera holder (1) for a stand with a mounting screw (25) provided in a carrier plate (22/60) screwable into the mounting thread (32) of a camera (33), wherein the carrier plate (22/60) is mounted directly or indirectly on a rotation plate (6), wherein it is adjustable in a plane perpendicular to the vertical rotation axis (37) of the rotation plate (6) and wherein the rotation plate (6) is fixable in any desired rotation position by means of a clamping device (10). The carrier plate (22/60) is steplessly adjustable in two horizontal axis perpendicular to each other relative to the rotation axis (37) of the rotation plate (6), by means of a cross sled (14), wherein the cross sled (14) exhibits a first lower profile rail (15) with a thereupon adjustable first sled (16), which on the rotation plate (6) is secured.

35 Claims, 10 Drawing Sheets

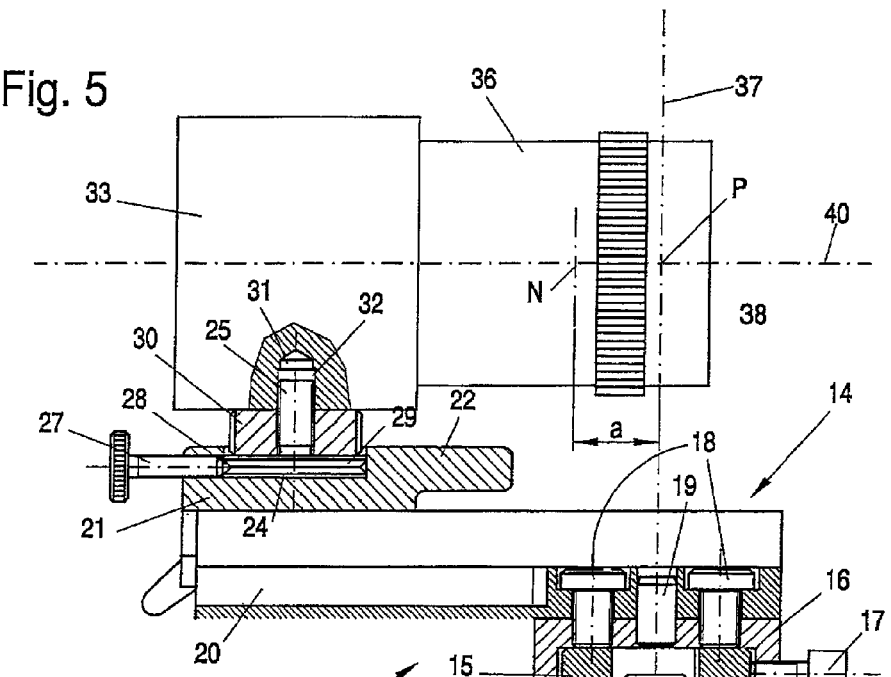
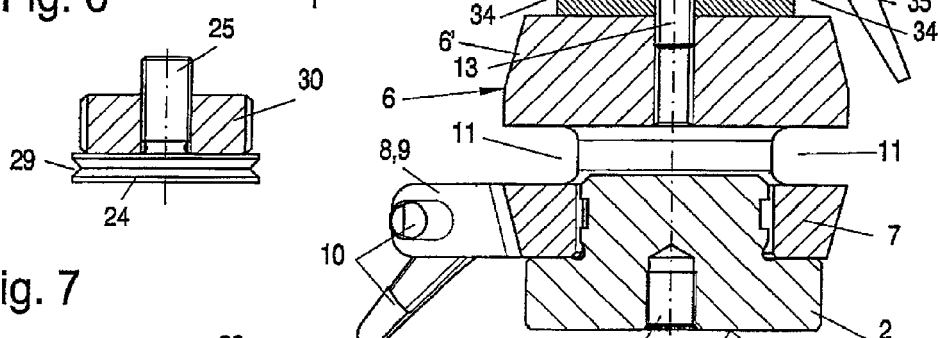
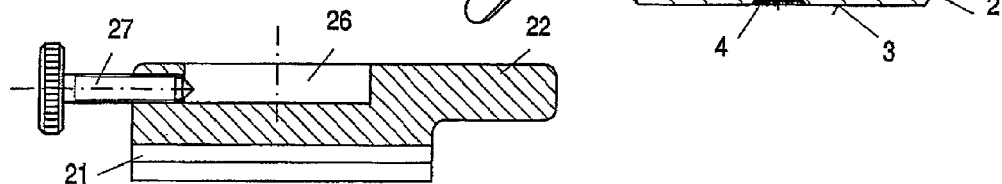
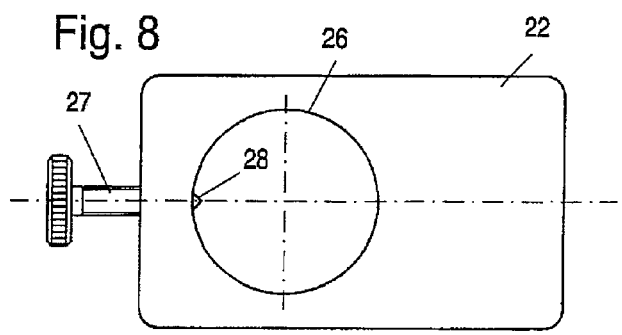

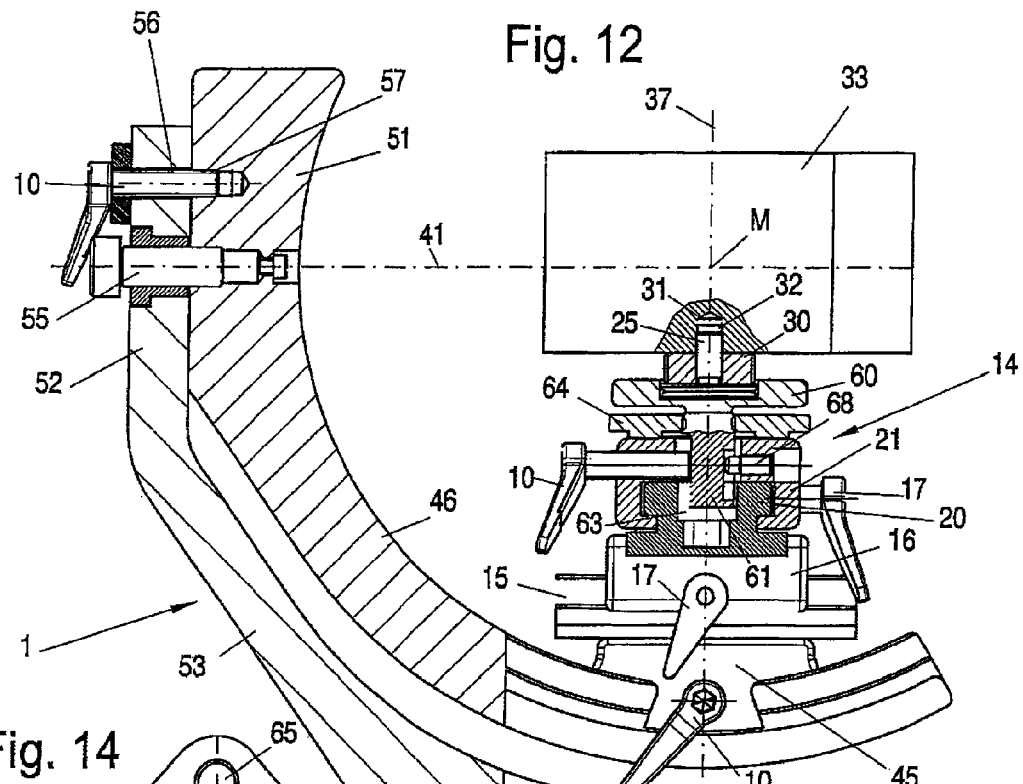
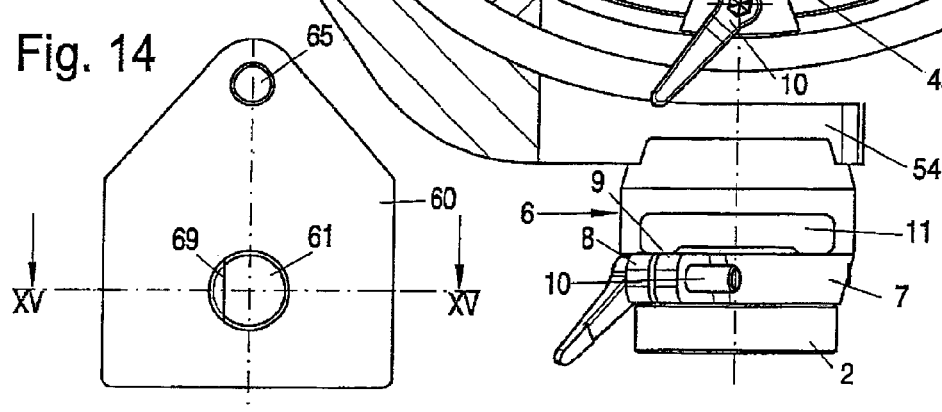
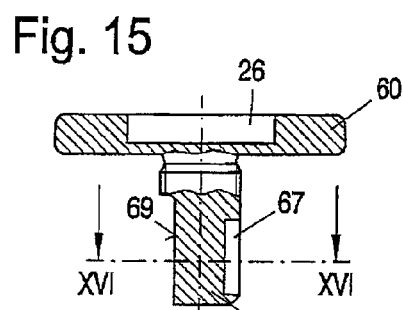
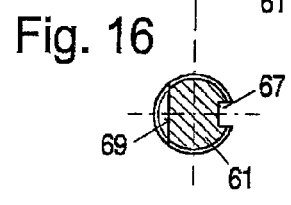
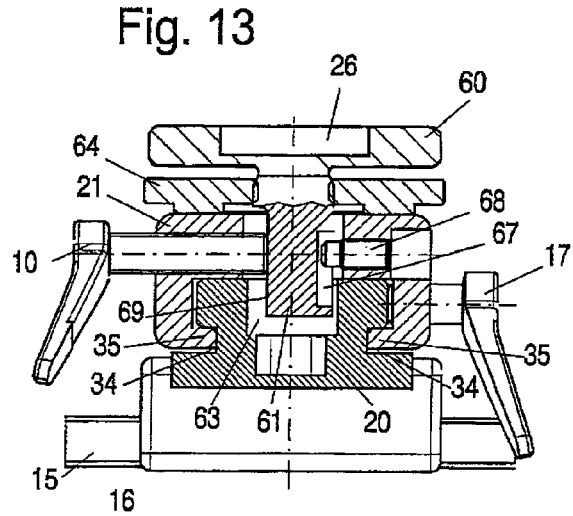

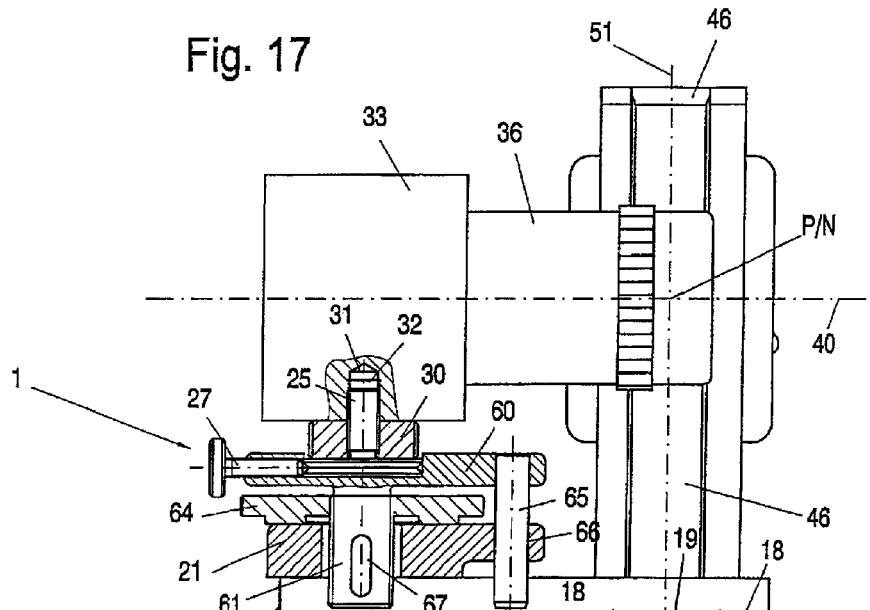
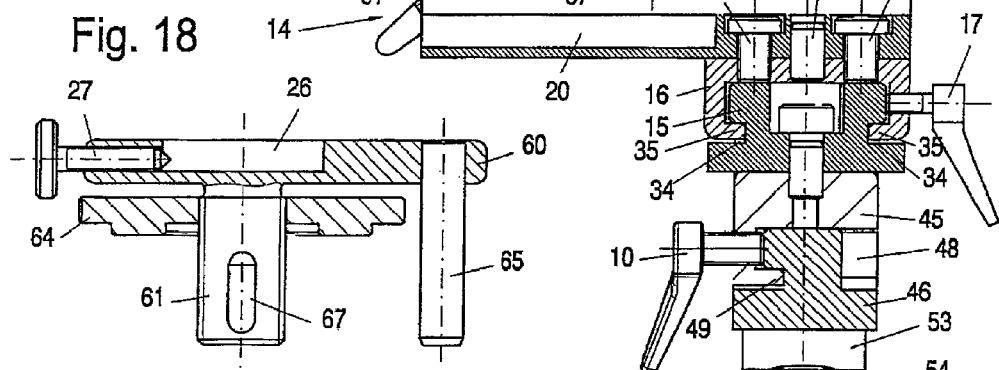
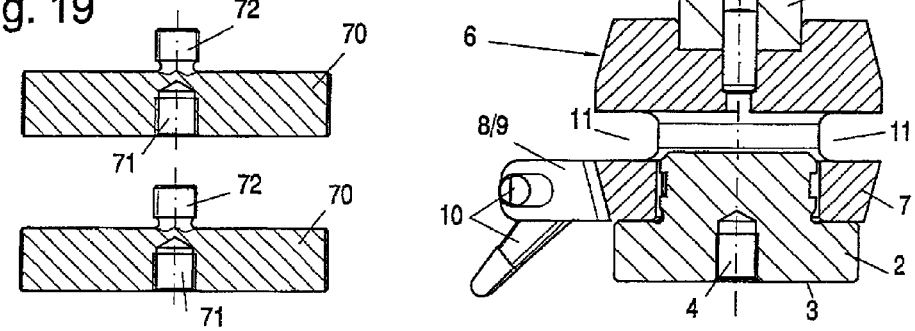
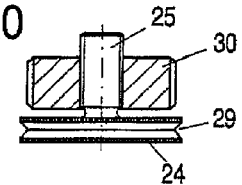
Fig. 17
Fig. 18
Fig. 19
Fig. 20

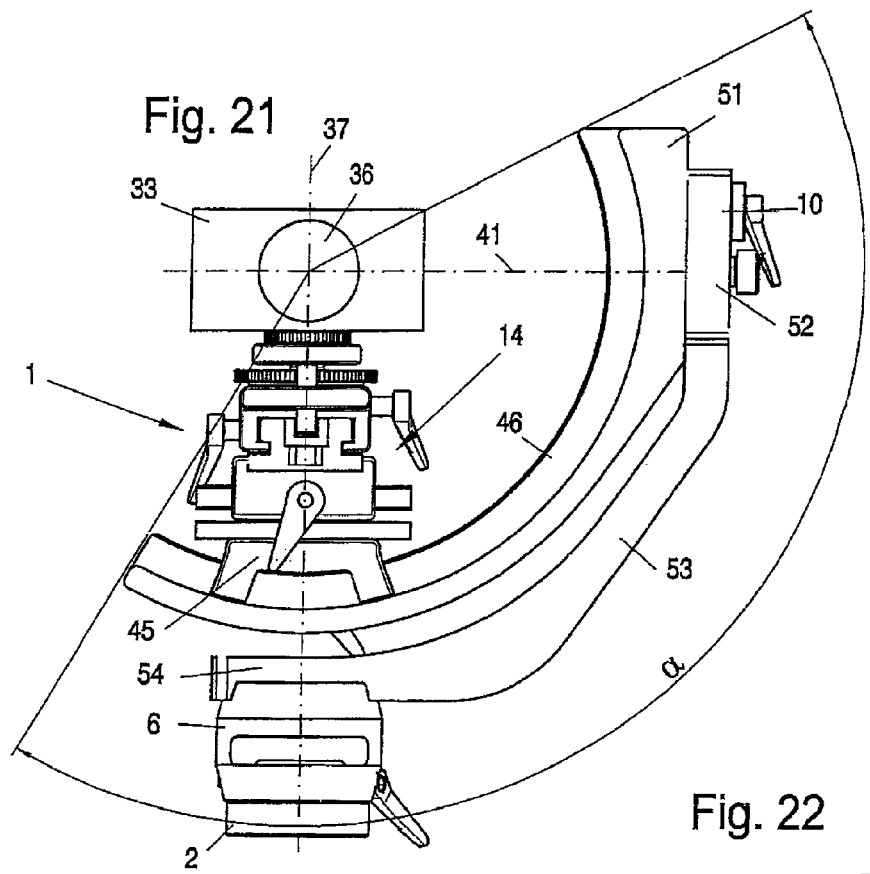
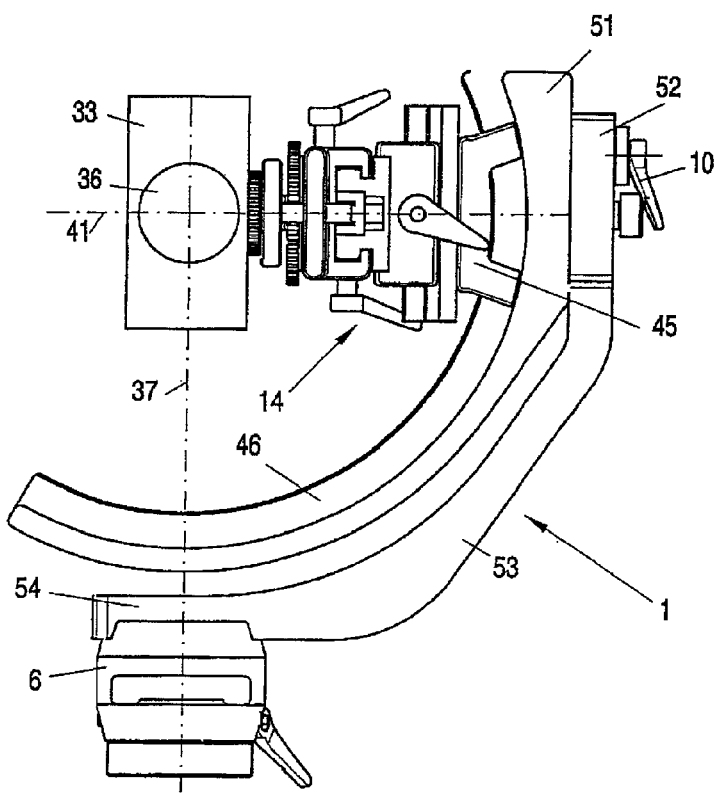

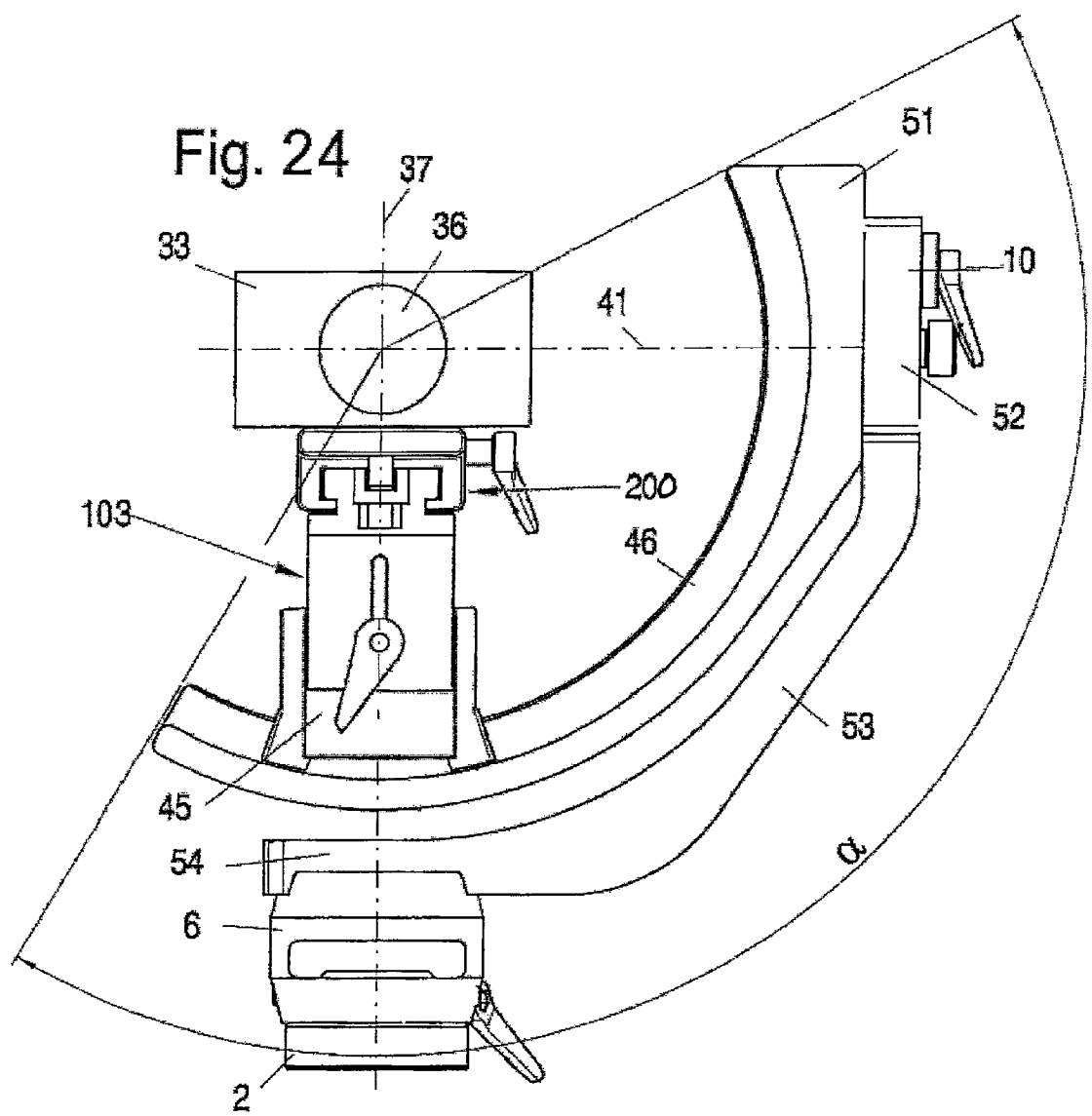

CAMERA HOLDER FOR STAND

FIELD OF THE INVENTION

The invention concerns a camera holder for a stand with a mounting screw adapted to be screwed into the threaded mounting bore of a camera, the mounting screw provided on a carrier plate, wherein the carrier plate is so mounted via a sled on a rotating plate, that it is adjustable in a plane perpendicular to the rotation axis of the rotation plate, wherein the rotation plate can be fixed in any desired rotation position by means of a clamping device.

BACKGROUND OF THE INVENTION

From DE 203 12 747 U1 a stand head for the vertical mounting of an analog or digital miniature camera is known. This stand head is provided with a device with which the camera, with the nodal point of its lens system, can be adjusted on the rotation axis of the stand head.

Therein the nodal point of a lens is understood to be the point lying on the optical axis of the lens at which the incident light beams cross before they reach the image sensor or, as the case may be, the film.

In this known device a vertical oriented, that is, parallel to the rotation axis of the stand, camera receptacle plate is provided as carrier plate, which exhibits multiple horizontal slits located above each other. Selectively, a threaded bolt or, as the case may be, a securing screw, can selectively be extended through the slits and be screwed into the threaded mounting bore of a camera, in order to secure the camera in vertical position on this carrier plate in various elevations and, with regard to the rotation axis of the lens, in various horizontal positions. Therein this carrier plate is secured on a horizontal profile rail, which is mounted diametric to the rotation axis of the stand, horizontally adjustable in the rotation plate of the stand.

With the aid of this device it is possible to position the nodal point of the camera lens on the rotation axis of the rotation plate or, as the case may be, the stand. This is possible however only in the vertical position of the camera, that is, in a position, in which the camera mounting screws are located on a vertical side surface of the camera. This means that, with normal cameras, in which the mounting thread is as a rule located in the bottom surface of the camera, with vertical orientation of the rotation axis, only profile format images (height greater than width) can be recorded. Besides this, it is difficult to adjust the camera precisely to the nodal point of its lens with the aid of a securing screw guided in one of multiple horizontal slits on the carrier plate.

In order to make possible an adjustment range in the direction of running of the sleds of the carrier plate that would be greater than merely corresponding to the length of the sleds, the carrier plate itself is adjustable on the profile rail in the horizontal direction transverse to the longitudinal direction of the profile rail. For this, multiple securing screws are provided, which are screwed through bore holes of the carrier plate in a horizontal arm of the profile rail. With this known device it is not possible to selectively make profile vs. landscape format (height less than width) panorama images.

SUMMARY

The invention is concerned with the task of providing a camera holder of the above described type, with which photographic cameras of different construction and size can in simple manner be securely so adjusted that their so-called "nodal point" is located in the rotation axis of the rotation plate of a stand, so that parallax errors in panorama photography can be avoided and horizontal and vertical images can be collated into a panorama image without parallax error.

This task is inventively solved thereby, that the carrier plate is adjustable by means of a cross sled in two horizontal axis, perpendicular to each other relative to the rotation axis of the rotation plate, without steps, wherein the cross sleds include a first lower profile rail with a thereupon adjustable first sled, which is mounted diametrically adjustable upon the rotation plate and wherein on the first sled a second upper profile rail with a second sled is secured, which runs transverse to the first profile rail, and of which the second sled is in the form of a carrier plate or is provided with a separate carrier plate which is oriented parallel to the two profile rails.

With the aid of the inventive provided cross sled, a camera can be secured in a horizontal position, that is, with mounting thread provided on the bottom side, and in a predetermined vertical position be horizontally adjusted in simple manner so that the nodal point of its lens, which can also be considered the focal point of the lens, is located precisely upon the rotation axis of the rotation plate of the stand, so that with equal angular movements of the rotation plate and the thereupon secured camera, error-free panorama recording can be carried out. With modern cameras, in particular with compact cameras, the distance between the nodal point and the mounting thread is indicated, so that with corresponding scales or legends on the profiled rails of the cross sled a precise adjustment can easily be undertaken. In the special case occurring in many cameras, that the optical axis and the mounting thread lie in a plane running perpendicular to the base plate of the housing, the arrangement can inventively be simplified to a single profile rail with a sled located or oriented parallel to the optical axis. This leads to a more economical embodiment with further simplified adjustment, which is just as effective for many cameras.

Modern digital cameras can be programmed for panorama recording, and display on the monitor respectively the edge of the previously recorded image, to which the next subsequent image is to be joined or attached, so that gaps in the image can be avoided.

The inventive camera holder can be seated in simple manner upon the conventional, generally available stand head.

The possibility is also provided, with the same mounting of a camera on the cross sleds, to selectively make profile and landscape images, that is, multiple sequentially recorded images offset by equal angular displacements, which with the aid of modem software and computer programs can be joined into a panorama image.

It is possible to carry out the same panorama recording once in profile format and once in landscape format, without image errors occurring thereby.

For this, there should be made possible an ability to adjustment along the guide rail out of the horizontal position by 90° into the vertical position and vice versa.

The embodiments described herein, provide the ability to adjust the camera also in the vertical orientation with its nodal point precisely on the vertical rotation axis of the rotation plate. While this radial adjustability plays no role in landscape format panorama recording, it is indispensable in profile panorama images, since otherwise a precise adjustment of the nodal point on the rotation axis would not be possible.

The embodiments described herein, provide the ability to make possible in a simple manner this radial adjustability of the carrier plate with regard to the curvature axis of the guide rail.

The embodiments provide for the case that the device should also be useable for cameras which exhibit large distances between the mounting surface of the camera mounting threaded bore and the optical axis.

With the embodiments described herein, the advantage is provided, that the guide rail can be adjustable out of its normally vertical functional position about its horizontal axis, at least by a small pivot angle, in both directions, in order to impart to the optical axis of the camera a suitable position relative to the horizontal, so that the camera can be aimed oriented upwards or downwards with a certain pivot angle.

The embodiments described herein provide a particularly simple translation of the inventive idea, for adapting to those cameras, of which the optical axis and camera mounting threaded bore lie on a plane running perpendicular to the base plate of the housing.

Also the embodiments described herein provide the possibility to selectively make profile and landscape panorama recordings.

The embodiment described herein provide the possibility, with other displaceable mounting of the camera, to selectively make portrait or landscape images seamlessly into a panorama image without parallax errors.

BRIEF DESCRIPTION OF THE DRAWINGS

On the basis of the illustrations the invention will be described in greater detail using two illustrative examples. There is shown:

FIG. 5 A camera holder in partially sectional, somewhat enlarged side view;
FIG. 6 A mounting screw with lock-nut in sectional side view;
FIG. 7 A second sled in the form of a carrier plate in sectional representation;
FIG. 8 A top view according to FIG. 7;
FIG. 12 A camera holder of FIG. 11 in partial sectional side view XII from FIG. 11;
FIG. 13 The sectional view of the cross sled from FIG. 12 in enlarged representation;
FIG. 14 The carrier plate with mounting screw in bottom view;
FIG. 15 A section XV-XV from FIG. 14;
FIG. 16 A section XVI-XVI from FIG. 14;
FIG. 17 The view of claim 11 in partial sectional and enlarged representation;
FIG. 18 The carrier plate with mounting screw and adjusting nut in sectional side view;
FIG. 19 Two spacer discs in section;
FIG. 20 The stand mounting screw with locking nut in section;
FIG. 21 The camera holder of FIG. 9 through 12 and 17 in the side view XXI from FIG. 11 in the horizontal position of the cross sled;
FIG. 22 The camera holder of FIG. 21 with the cross sled in vertical positions;

FIG. 24 As an alternative to height adjustment via spacer disks, a height adjustable mount.

DETAILED DESCRIPTION OF THE PREFERRED EMBODIMENTS

The camera holder shown in FIGS. 1 through 5 provides a simplified design, with which images can basically be recorded in landscape format.

This camera holder 1 can either be used as a stand head or can be mounted upon the stand head of a conventional photographic stand, i.e., tripod.

Figure 1:
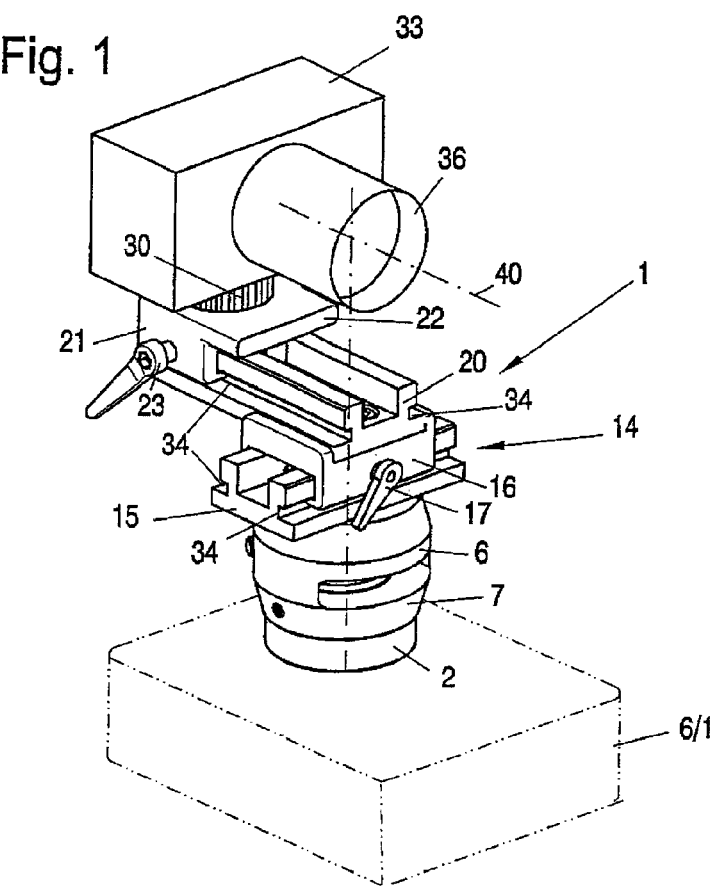
FIG. 1 A camera holder in 3-D view.
Figure 2:
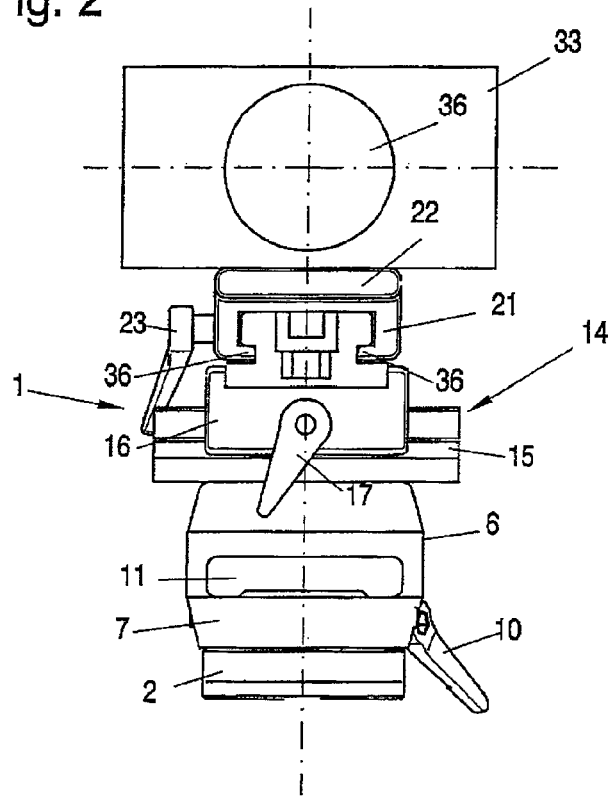
FIG. 2 A camera holder according to FIG. 1 in top view.
Figure 3:
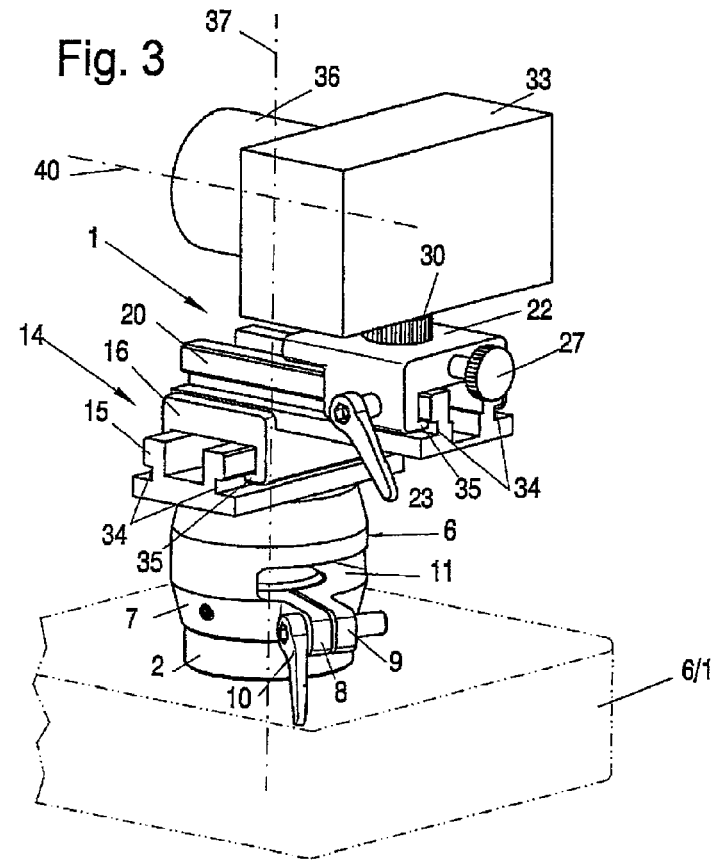
FIG. 3 A camera holder in rear 3-D view.
Figure 4:
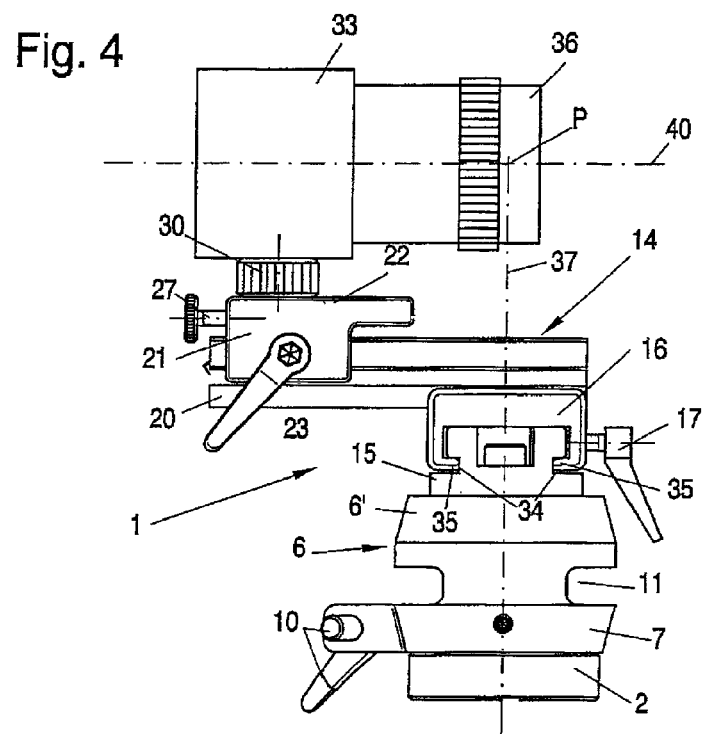
FIG. 4 A camera holder in side view.
Figure 9:
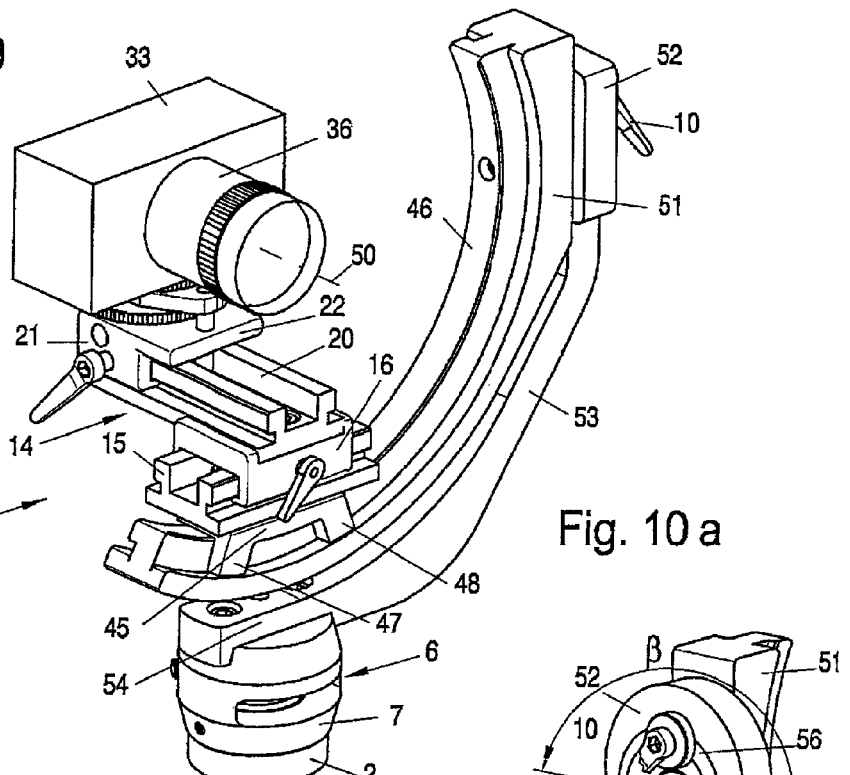
FIG. 9 A second embodiment of the camera holder in 3-D-view from the front.

In FIGS. 1 and 3 the dashed lines schematically represent the carrier plate or base plate, into which the camera holder 1 can be screwed in the conventional manner by means of a mounting screw, which is screwed into the central lower stand thread 4 of the base plate 2.

The camera holder 1 is comprised of a round base plate 2 which in its base surface 3 has a central threaded bore hole 4 as stand mounting thread, which is in the form of a closed bore. With a concentric, cylindrical coupling screw 5 it serves as carrier element for a rotation plate 6, which includes the coupling screw 5 with a slitted tensioning ring 7. This tensioning ring 7 is provided with two radially outwardly projecting tension plates or flanges 8 and 9, which by means of a clamping screw 10 can be tensioned on the coupling screw, so that the clamping ring 7 is fixed securely and non-rotatably on the coupling screw 5. In order to provide the elasticity necessary for tension ring 7 connected unitarily with the rotation plate 6, a hollow space 11 is provided between it and the partially conical upper part 6' of the rotation plate 6.

On the horizontal upper face surface 12, a cross sled 14 is secured by means of one or more screws 13. This cross sled 14 is comprised of a first lower profile rail 15, which is screwed tight directly upon the upper face surface 12 of the rotation plate 6 with the aid of the screw 13. This first lower profile rail 15 is provided on its upper side with a first lower sled 16, which is steplessly adjustable thereupon in the longitudinal direction of the profile rail and is fixable in various positions by means of a locking screw 17.

On this first lower sled 16, a second upper profile rail 20 is secured by means of securing screws 18 and a centering screw 19, and the second upper profile rail 20 runs transverse to the first lower profile rail 15. The second upper profile rail 20 is also provided on its upper side with a second sled 21, which in the illustrative embodiment of FIGS. 1 through 8 itself forms a carrier plate 22. The second sled 21 is stepless or continuously adjustable on the second lower profile rail 20 in the horizontal direction and is fixable in any desired position by means of a locking screw 23.

For the fixable receiving of a mounting screw 25 provided with a round securing flange 24, the carrier plate 22 is provided on its upper side with a cylindrical recess 26, into which a securing screw 27, such as a knurl screw, can be radially screwed in. This securing screw 27 is provided with a tip 28, which fits form-fittingly in a circumscribing V-groove of the securing flange 24. The mounting screw 25 is therewith removable from the carrier plate 22.

On the mounting screw 25 there is seated a locking nut 32 in the form of a knurl nut, which serves for tensioning the mounting screw 25, when this is screwed into a mounting thread 32 of a camera 33 in the form of a nut threading in a blind hole 31, which is shown, among others, in FIG. 5.

As conventional with cross sleds, the profile rails 15 and 20 are respectively provided with outer guide grooves 34, in which the first lower sled 16 and second sled 21 are guided free of play, with close tolerance with guide bars or rails.

With the aid of the cross sled 14 securable upon the rotation plate 6, it is possible to adjust the lens 36 of the camera 33, with its so-called nodal point N precisely upon the vertical rotation axis 37 of the rotation plate 6. From the position which the camera 33 assumes in FIG. 5, it is necessary to displace this by distance (a) in the arrow direction 38, whereby the sled 21 with the thereupon secured camera 33 is displaced upon the profile rail 20 and thereafter is fixed in the precise position by means of the knurled screw 23.

With the aid of the sled 16, transverse adjustment of the camera, or as the case may be the profile rail 20, is possible, wherein the sled 16 is fixable in the precise position upon the profile rail 15 by means of the knurl screw 17.

A camera 33 so arranged can record error-free panorama images because the camera 33 rotated by an angle, which represents the image segment, by appropriate stepwise rotation of the rotation plate 6 about its vertical rotation axis 37. Since herein the nodal point N is located precisely in the cross section P of the optical axis 40 of the lens 36 with the rotation axis 37 of the rotation plate 6, no parallax errors can occur. Thus, a distortion-free and error-free panorama image can be produced.

In the embodiment according to FIGS. 9 through 22, the same cross sled 14 is not secured directly upon the rotation plate 6, which here in the same manner is provided as in the embodiments according to FIGS. 1 through 8. Rather, here the cross sleds 14 are adjustable upon the guide rail 46 by means of a bearing block 45. The guide rail 45 runs arc-shaped and exhibits the shape of a segment of a ring and extends over a centering angle α of approximately 145°. (FIG. 21). Alternatively, the cross sleds 14 in these figures can also be employed in the simplified embodiment shown in FIG. 23.

The bearing block is form-fittingly in engagement with an L-shaped rail profile 50 by means of two sideways projecting slide feet 47 and 48 as well as by means an L-rib 49, which extends over the entire base length of the guide rail 46. The L-rib 49, which is best seen from FIG. 17, forms a groove-spring connection between the bearing block 45 and the guide rail 4 and form-fittingly engages in the guide groove 49' of guide rail 46, being adjustably guided therein.

Normally the guide rail 46 lies in a vertical plane 51, which runs parallel at least to the vertical rotation axis 37 of the rotation plate 6, preferably however lies in this rotation axis 37. In order however also to have the possibility to pivot the camera about the nodal point N, on which its lens is adjusted with the aid of the cross sled 14, about a horizontal pivot axis 41, which lies in the elevation of its axis of curvature M, at least by a small angular amount out of the precise vertical position, the guide rail 46 is not directly secured to the rotation plate 6. Instead, the guide rail 46 is mounted on the vertical shank 52 of an angle-like or bow shaped carrier arm 53 with a section 51 lying in the height of its curvature axis. The lower horizontal section 54 of the carrier arm 53 is fixedly secured upon the rotation plate 6. The vertical upper section 52 of the carrier arm 53 is mounted pivotable with a horizontal bearing screw 55, of which the axis forms the pivot axis 41. Therewith the arrangement is so situated that the pivot axis 41 lies precisely at the height of the curvature axis M of the guide rail 46, which for its part intersects the rotation axis 37. The rotation axis 37 and the pivot axis 41 lie thus in a common vertical plane and have their intersection point at the nodal point N-P.

In order to be able to fix the guide rail 46 at various tilt positions, a knurl screw 10 is provided, which above the bearing pin 55 extends through a guide slit 56 curved about the axis 41 of the vertical section 52, and is screwed into a threaded bore 57 of the upper section 51 of the guide rail 46.

Figure 10A:
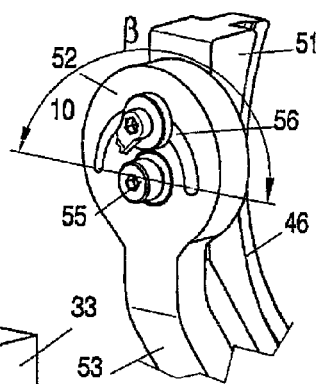
FIG. 10a A different embodiment of the head part of the carrier arm of FIG. 10.
Figure 10:
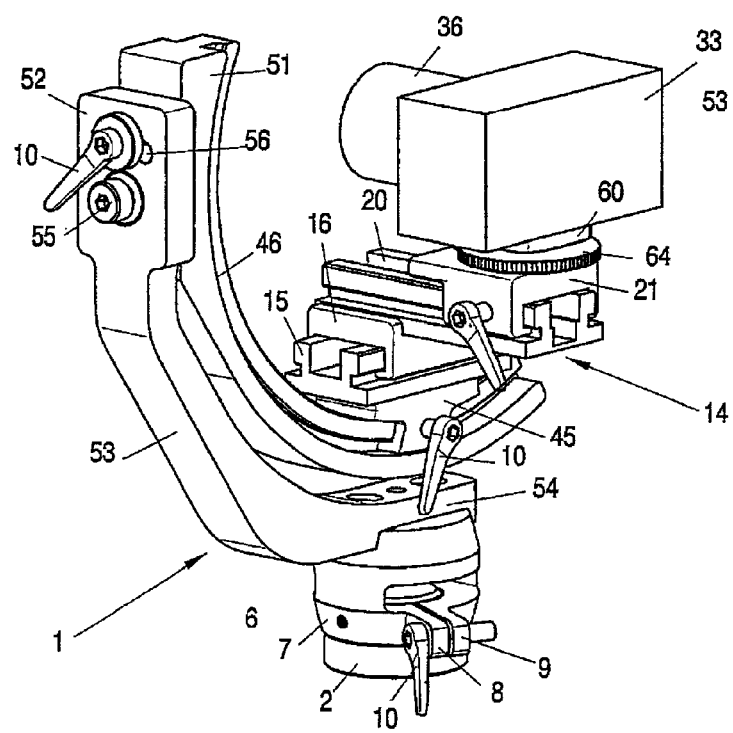
FIG. 10 A camera holder according to FIG. 9 in 3-D-view from the back.
Figure 11:
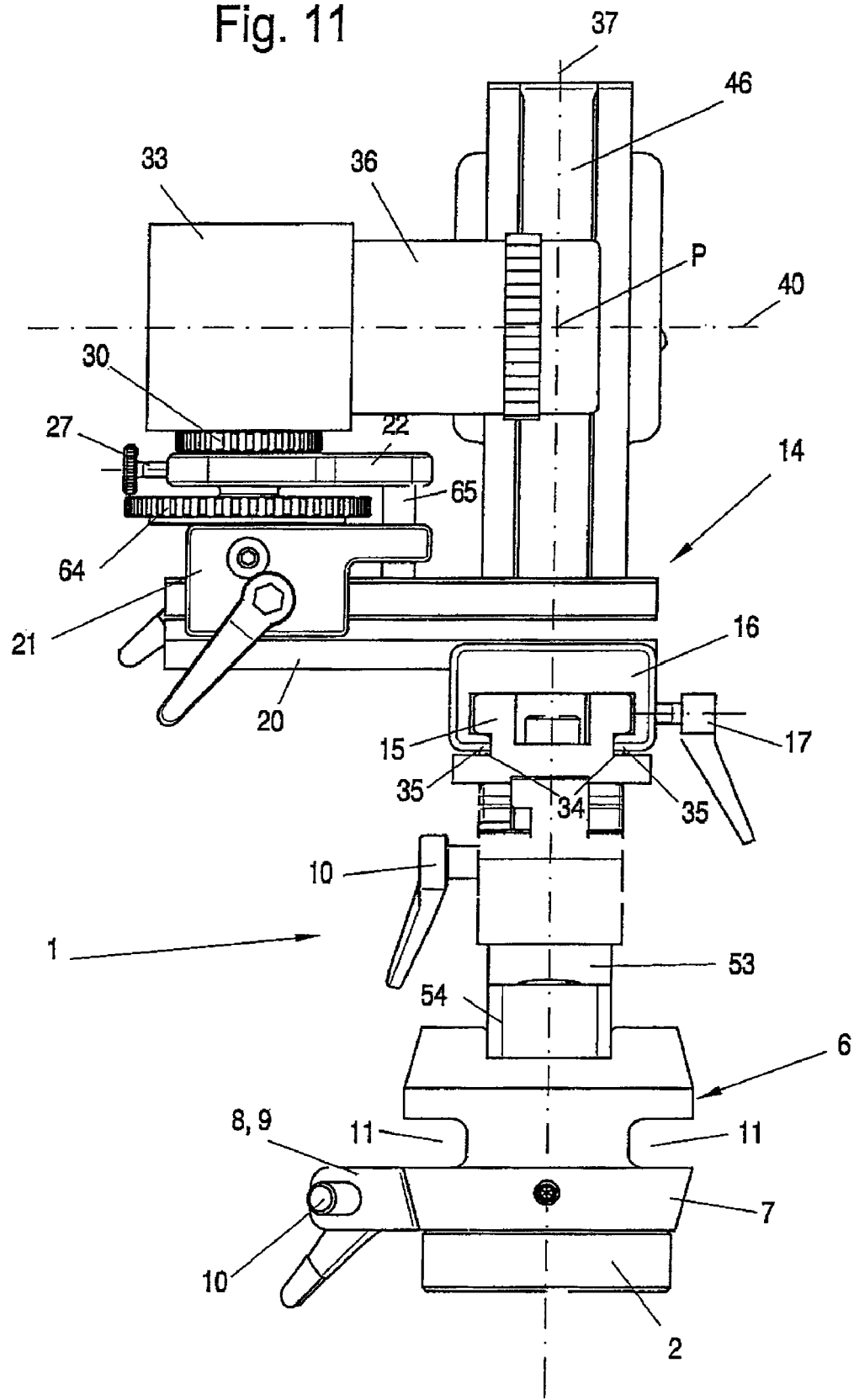
FIG. 11 A camera holder of FIG. 9 and 10 in side view.

In FIG. 10a a different embodiment of the upper section 51 of the guide rail 46 is shown. Therein its upper section 51 is in the form of an arc-shaped plate and provided with a guide slit 56, which extends over an angle P of somewhat more than 180° so that the guide rail 46 can be pivoted out of the vertical position in both directions by 90° and can be fixed in this tilted or pivoted position.

While it does not matter which distance the optical axis 40 of the camera 30 has from the rotation plate 6 in the embodiments according to FIGS. 1 through 8 with regard to the quality of the panorama images in landscape format, that is, in the horizontal position, it is necessary in the embodiments according to FIGS. 9 through 22 to be able to adjust the distance of the optical axis of the camera 36 from the rotation axis 37 of the rotation plate 6 precisely to zero, if panorama images are to be recorded in the profile format. In such ebodiments, the cross sled 14, with its bearing block 45, is located in the vertical position shown in FIG. 22 and the optical axis 40 of the camera 33, or as the case may be the lens 36, must coincide with the curvature axis M of the guide rail 46.

In order to be able to accomplish this, in this embodiment the cross sled 14, or, more precisely, the second upper sled 21, is equipped or provided with a separate carrier plate 60. This carrier plate 60 is radially adjustable with regard to the curvature axis M. This carrier plate 60 exhibits a recess 26 on its upper side for receiving the securing flange 24 of the mounting screw 25 and the therewith associated fixing screw 27. The bottom side of carrier plate 60 is provided with a mounting screw, which extends or projects freely through the bore 62 of the second sled 21 into the hollow space 63 of the upper profile rail 20. A disc-shaped and rotatable locking nut 64, is seated upon the upper side of the upper sled 21 and is in engagement with the mounting screw 61. By corresponding rotation of the threaded nut 64 the mounting screw 61 can be displaced radially with the carrier plate 60 relative to the curvature axis M.

In order to secure the carrier plate 60 against rotation and at the same time to enable it to have good guidance, the carrier plate 60 is provided with an eccentric located guide pin 65 (FIGS. 11, 14, 17 and 18), which is rigidly connected therewith and projects slidably or displaceably through a co-axial bore 66 of the sled body 21. For limiting the adjustment path, the mounting screw 61 is provided with a guide groove 67, into which a mounting screw 68 extends, guidingly screwed in sideways into the upper sled 21. Lying diametrically oppositely to this guide groove 67, there is provided on the mounting screw 61 an axially parallel planar clamping surface 69, onto which a knurl screw 10 can be clampingly applied, so that a previously adjusted position of the mounting screw 61 or, as the case may be, carrier plate 60 can be maintained or secured.

As can best be seen from FIG. 13, the threaded screw 68 engaging in the groove 67 of the mounting screw 61 for the knurl screw 10 serves simultaneously as counter bearing.

In order to bridge over larger spatial differences of the carrier plate 60 from the curvature axis M, if for example very small cameras are being employed, then spacer discs 70 can be screwed upon the mounting screw 25 of the carrier plate 60 by means of a bottom side central threaded bore 71 and co-axial mounting screw 72. The co-axial mounting screw 72 can be screwed into the threaded bore 32 of the camera or in the threaded bore 71 of a further distance disc 70. Alternatively, as can be seen in FIG. 24, this goal can also be accomplished by a height adjustable mount or framework 103. The reference number 200 in this figure characterizes a general direction of displacement.

It is illustrated in FIGS. 19 and 20 how the distance discs 70 when needed can be secured upon the mounting screw 25.

In order to facilitate the fixing of the bearing block 45 more precisely and more securely in its horizontal position shown in FIG. 21 or, as the case may be, in its vertical position shown in FIG. 22, it is useful to provide detent devices in these positions.

Figure 23:
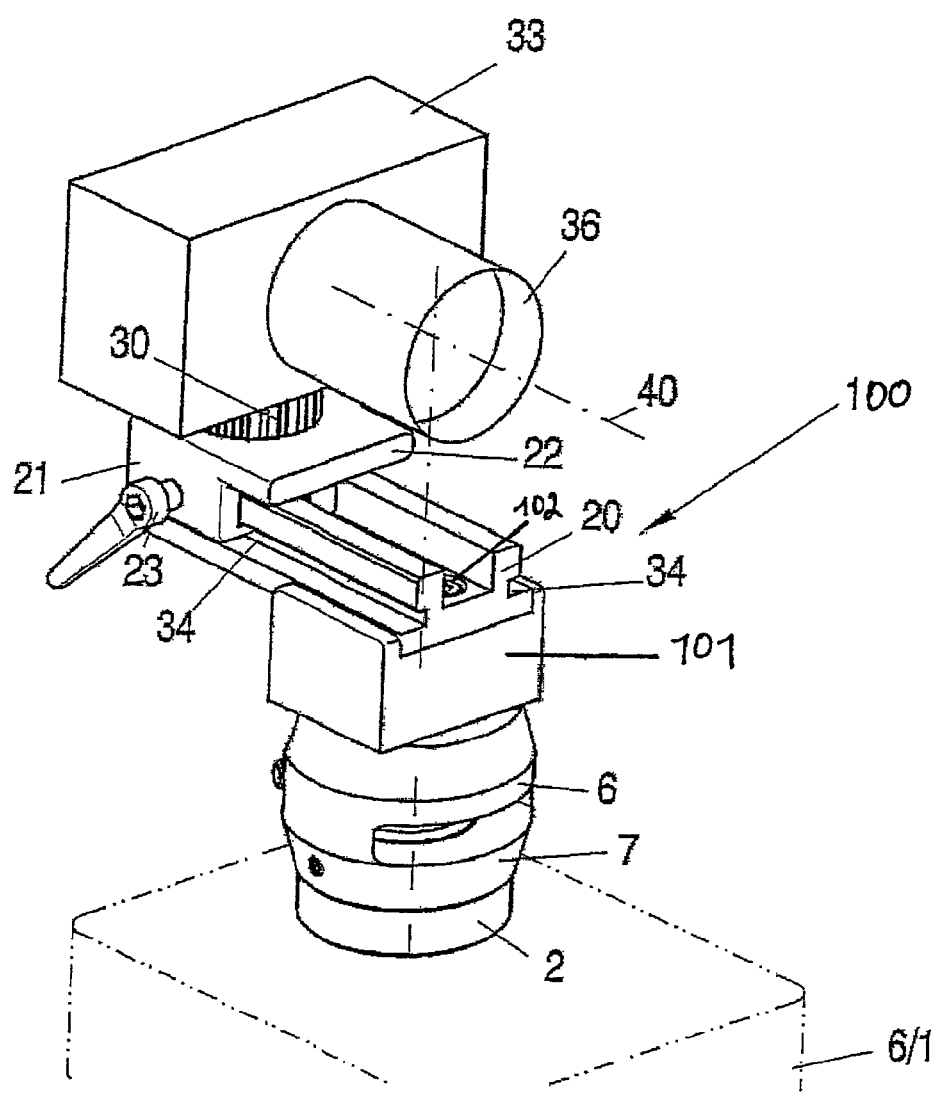
FIG. 23 A simplified camera holder for cameras, in which the optical axis and mounting thread lie in a plane running perpendicular to the base plate of the housing.

A simplified design of a camera holder 100, as shown in FIG. 23, is comprised of a round socket plate 2 that is designed as described above, however, upon its upper surface, a carrier block 101 for the upper profile rail 20 is secured by means of a central screw 102. Also, the profile rail 20 is provided with a sled 21. The sled 21 carries the carrier plate 22, equipped as described above, with the securing device for the camera 33 that is adjustable stepless in the horizontal direction and fixable in any desired position via a knurl screw 23.

The invention claimed is:

1. A camera holder for a stand, with a mounting screw provided in a carrier plate screwable into a mounting thread of a camera, wherein the carrier plate is mounted directly or indirectly on a rotation plate, wherein it is adjustable in a plane perpendicular to a vertical rotation axis of the rotation plate and wherein the rotation plate is fixable in any desired rotation position by means of a clamping device wherein the carrier plate is steplessly adjustable in two horizontal axes perpendicular to each other relative to the rotation axis of the rotation plate by means of a cross sled, wherein the cross sled includes a first lower profile rail with an adjustable first sled, which is secured on the rotation plate, and wherein upon the first sled a second upper profile rail with a second sled is secured, which runs transverse to the first profile rail and of which the second sled is a carrier plate or is provided with a separate carrier plate oriented in parallel with the first lower profile rail and the second upper profile rail, wherein the first lower profile rail of the cross sled is mounted by means of a bearing block adjustably upon a circular curved guide rail, so that the carrier plate is adjustable about an optical axis of a lens of a thereupon secured camera displaced 90° out of a horizontal orientation into a vertical orientation.

2. The camera holder according to claim 1, wherein the circular curved guide rail lies at least approximately in a vertical plane parallel to the rotation axis of the rotation plate.

3. The camera holder according to claim 2, wherein the circular curved guide rail, with regard to its curvature axis (M), extends in the vertical plane over an angle (α) of at least 90°.

4. The camera holder according to claim 3, wherein the carrier plate is radially adjustable with regard to the curvature axis (M) of the circular curved guide rail.

5. The camera holder according to claim 4, wherein the carrier plate is connected adjustably with the second upper sled of the cross sled by means of a mounting screw.

6. The camera holder according to claim 5, wherein the mounting screw is in engagement with a central threaded bore of a lock-nut supported on the second upper sled.

7. The camera holder according to claim 3, further comprising spacer discs with a threaded bore for adjustment of the optical axis of certain cameras on the curvature axis (M) of the guide rail, the spacer discs being screwed upon the mounting screw of the carrier plate and which are provided with a thereto co-axial mounting screw, which is adapted to being screwed into the threaded bore of the camera or in the threaded bore of a further spacer disc.

8. The camera holder according to claim 3, wherein a height adjustable mount is provided for adjustment of the optical axis of certain cameras to the curvature axis (M) of the guide rail, the mount being seated upon the bearing block.

9. The camera holder according to claim 3, wherein the circular curved guide rail is secured by means of a pivot bearing at a section lying in the height of its curvature axis (M) to an angled or bow-shaped carrier arm connected with the rotation plate, such that it is pivotable out of its vertical position about a horizontal pivot axis crossing the curvature axis (M), and is securable on this carrier arm in various pivot positions.

10. The camera holder according to claim 1, wherein the circular curved guide rail and the bearing block are form-fittingly in engagement with each other via at least one groove-spring connection.

11. The camera holder according to claim 1, wherein the sleds are fixable on their profile rails by clamping screws.

12. The camera holder according to claim 1, wherein the bearing block is immovably arrestable upon the circular curved guide rail by means of a clamping device and/or a detent device, at least in the horizontal orientation and the vertical position of the carrier plate.

13. The camera holder according to claim 1, wherein the rotation plate is fixably rotatable in various rotation positions upon a base plate which is provided on its upper side with a central coupling screw and on the bottom side with a stand thread.

14. A camera holder for a stand, with a mounting screw provided in a carrier plate screwable into a mounting thread of a camera, wherein the carrier plate is mounted directly or indirectly on a rotation plate, wherein it is adjustable in a plane perpendicular to a vertical rotation axis of the rotation plate and wherein the rotation plate is fixable in any desired rotation position by means of a clamping device, wherein the carrier plate is steplessly adjustable parallel to an optical axis by means of a sled, wherein the sled is guided in a profile rail, wherein the profile rail of the sled is mounted to be adjustable via a bearing block upon a circular or arc shaped curved guide rail, so that the carrier plate is adjustable about an optical axis of a lens of a camera secured thereupon displaced by 90° out of a horizontal position into a vertical position.

15. The camera holder according to claim 14, wherein the guide rails lie at least approximately in a vertical plane parallel to the rotation axis of the rotation plate.

16. The camera holder according to claim 14, wherein the guide rail, with respect to its curvature axis (M), extends in the vertical plane over an angle (α) of at least 90°.

17. The camera holder according to claim 14, wherein the carrier plate is radially adjustable with regard to the curvature axis (M) of the guide rail.

18. The camera holder according to claim 17, wherein the carrier plate is adjustably connected with the sled by means of a mounting screw.

19. The camera holder according to claim 18, wherein the mounting screw is in engagement with a central threaded bore of a lock-nut supported on the sled.

20. The camera holder according to claim 16, further comprising spacer discs for adjusting the optical axis of certain cameras upon the curvature axis (M) of the guide rail, the spacer discs being screwed upon a mounting screw of the carrier plate by means of a threaded bore and which are provided with a thereto co-axial mounting screw, which can be screwed into a threaded bore of the camera or in a thread bore of an additional spacer disc.

21. The camera holder according to claim 16, further comprising a height adjustable mount seated upon the bearing block for adjustment of the optical axis of certain cameras upon the curvature axis (M) of the guide rail.

22. The camera holder according to claim 17, wherein the guide rail is secured by means of a pivot bearing at a section lying in a height of its curvature axis (M) to an angled or bow-shaped carrier arm connected with the rotation plate, such that it is pivotable out of its vertical position about a horizontal pivot axis crossing the curvature axis (M), and is securable on the carrier arm in various pivot positions.

23. The camera holder according to claim 14, wherein the guide rail and the bearing block are form-fittingly in engagement with each other via at least one groove-spring connection.

24. The camera holder according to claim 14, wherein the sled is fixable on its profile rail.

25. The camera holder according to claim 14, wherein the bearing block is immobly arrestable upon the guide rail by means of a clamping device and/or a detent device, at least in the horizontal position and the vertical position of the carrier plate.

26. The camera holder according to claim 14, wherein the rotation plate is fixable upon a base plate provided on its upper side with a central coupling screw and on its bottom side with a stand thread.

27. A camera holder for a stand, with a mounting screw provided in a carrier plate screwable into a mounting thread of a camera, wherein the carrier plate is adjustably connected with an upper sled of a cross sled by means of a mounting screw, wherein the carrier plate is mounted directly or indirectly on a rotation plate, wherein it is adjustable in a plane perpendicular to a vertical rotation axis of the rotation plate and wherein the rotation plate is fixable in any desired rotation position by means of a clamping device, wherein a displacement device is mounted displaceably upon an arc shape curved guide rail such that the carrier plate allows itself to be adjusted about an optical axis of a lens of a thereupon secured camera displaced by 90° out of a horizontal position into a vertical position.

28. The camera holder according to claim 27, wherein the guide rail lies at least approximately in a vertical plane parallel to the rotation axis of the rotation plate.

29. The camera holder according to claim 27, wherein the guide rail, with reference to its curvature axis (M), extends in the vertical plane over an angle ($\alpha$) of at least 90°.

30. The camera holder according to claim 27, the carrier plate, with reference to the curvature axis (M) of the guide rail, is radially adjustable.

31. The camera holder according to claim 27, wherein a guide screw is in engagement with a central threaded bore of a lock-nut supported on the upper sled.

32. The camera holder according to claim 29, further comprising spacer discs having a threaded bore for adjustment of the optical axis of certain cameras on the curvature axis (M) of the guide rail, the spacer discs being screwed upon the mounting screw of the carrier plate and which are provided with a thereto co-axial mounting screw, which is adapted to being screwed into a threaded bore of the camera or in a threaded bore of an additional spacer disc.

33. The camera holder according to claim 29, further comprising a height adjustable mount seated upon the bearing block for adjustment of the optical axis of certain cameras upon the curvature axis (M) of the guide rail.

34. The camera holder according to claim 29, wherein the guide rail is secured by means of a pivot bearing at a section lying in the height of its curvature axis (M) to an angled or bow-shaped carrier arm connected with the rotation plate, such that it is pivotable out of its vertical position about a horizontal pivot axis crossing the curvature axis (M), and is securable on the carrier arm in various pivot positions.

35. The camera holder according to claim 27, wherein the guide rail and the bearing block are form-fittingly in engagement with each other via at least one nut-spring connection.

* * * * *